(12) United States Patent
Rao et al.

(10) Patent No.: US 11,477,243 B2
(45) Date of Patent: Oct. 18, 2022

(54) OFF-POLICY CONTROL POLICY EVALUATION

(71) Applicant: Google LLC, Mountain View, CA (US)

(72) Inventors: Kanury Kanishka Rao, Santa Clara, CA (US); Konstantinos Bousmalis, London (GB); Christopher K. Harris, Los Altos, CA (US); Alexander Irpan, Palo Alto, CA (US); Sergey Vladimir Levine, Berkeley, CA (US); Julian Ibarz, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 375 days.

(21) Appl. No.: 16/827,596

(22) Filed: Mar. 23, 2020

(65) Prior Publication Data

US 2020/0304545 A1  Sep. 24, 2020

(30) Foreign Application Priority Data

Mar. 22, 2019  (GR) ............................... 20190100130

(51) Int. Cl.
*G06N 20/20* (2019.01)
*H04L 9/40* (2022.01)
(Continued)

(52) U.S. Cl.
CPC ............ *H04L 63/20* (2013.01); *G06K 9/6256* (2013.01); *G06K 9/6264* (2013.01); *G06N 3/0454* (2013.01); *G06N 3/08* (2013.01)

(58) Field of Classification Search
CPC ........ G06N 3/08; G06N 3/0454; G06N 3/008; G06N 3/084; G06N 3/006; G06N 3/0472; G06N 20/00; G06N 3/088; G06N 7/005; G06N 20/10; G06N 3/0445; G06N 5/04; G06N 20/20; G06N 3/04; G06N 3/126; G06N 5/003; G06N 3/0481; G06N 5/022; G06T 2207/20081; G06T 2207/20084;
(Continued)

(56) References Cited

U.S. PATENT DOCUMENTS

| 2020/0104684 A1* | 4/2020 | Vecerik | G06N 3/006 |
| 2020/0265305 A1* | 8/2020 | Budden | G06N 3/088 |
| 2020/0293883 A1* | 9/2020 | Budden | G06N 3/088 |

OTHER PUBLICATIONS

Arjona-Medina et al. Rudder: Return decomposition for delayed rewards, arXiv 1806.07857v3, Sep. 10, 2019, 102 pages.
(Continued)

*Primary Examiner* — Quan M Hua
(74) *Attorney, Agent, or Firm* — Fish & Richardson P.C.

(57) ABSTRACT

Methods, systems, and apparatus, including computer programs encoded on computer storage media, for off-policy evaluation of a control policy. One of the methods includes obtaining policy data specifying a control policy for controlling a source agent interacting with a source environment to perform a particular task; obtaining a validation data set generated from interactions of a target agent in a target environment; determining a performance estimate that represents an estimate of a performance of the control policy in controlling the target agent to perform the particular task in the target environment; and determining, based on the performance estimate, whether to deploy the control policy for controlling the target agent to perform the particular task in the target environment.

20 Claims, 4 Drawing Sheets

(51) Int. Cl.
*G06K 9/62* (2022.01)
*G06N 3/08* (2006.01)
*G06N 3/04* (2006.01)

(58) Field of Classification Search
CPC .......... G06T 7/11; G06T 3/4046; G06T 7/50; G06K 9/6271; G06K 9/6257; G06K 9/6259; G06K 9/6262; G06K 9/628; G06K 9/6228; G06K 9/6232; G06K 9/6256; B25J 13/089; B25J 15/0009; B25J 9/0084; B25J 9/163; B25J 9/1671; B25J 9/161; B25J 9/1605
See application file for complete search history.

(56) References Cited

OTHER PUBLICATIONS

Babaeizadeh et al. "Stochastic variational video prediction," arXiv 1710.11252v2, Mar. 6, 2018, 15 pages.
Bellemare et al. "The arcade learning environment: An evaluation platform for general agents," Journal of Artificial Intelligence Research, vol. 47, Jun. 14, 2013, 27 pages.
Brockman et al. "OpenAI gym" arXiv 1606.01540, Jun. 5, 2016, 4 pages.
Cobbe et al. "Quantifying generalization in reinforcement learning," arXiv 1812.02341v3, Jul. 14, 2019, 14 pages.
Deng et al. "ImageNet: A Large-Scale Hierarchical Image database," CVPR, Jun. 20, 2009, 8 pages.
Dudik et al. "Double robust policy evaluation and optimization," Statistical Science, 29(4), 2014, 27 pages.
Farahmand et al. "Model selection in reinforcement learning," Machine Learning 85(3), Dec. 2011, 34 pages.
Hanna et al. "Bootstrapping with models: Confidence intervals for Off-Policy evaluation," Proceedings of the 16th Conference on Autonomouns Agents and MultiAgent Systems, Richland, SC, Feb. 12, 2017, 2 pages.
Horvitz et al. "A generalization of sampling without replacement from a finite universe," Journal of the American statistical Association, 47(260), Dec. 1952, 24 pages.
James et al. "Sim-to-real via sim-to-sim: Data efficient robotic grasping via randomized-to-cononical adaptation networks," IEEE Conference on Computer Vision and Pattern Recognition, Mar. 2019, 11 pages.
Jiang et al. "Double robust off-policy value evaluation for reinforcement learning," arXiv 1511.03722, Nov. 2015, 12 pages.
Kakade et al. "Approximately optimal approximate reinforcement learning," ICML, Jul. 8, 2002, 8 pages.
Kalashnikov et al. "Qt-opt: Scalable deep reinforcement learning for vision-based robotic manipulation," arXiv 1806.10293v3, Jul. 14, 2019, 14 pages.
Kiryo et al. "Positive-unlabeled learning with non-negative risk estimator," NIPS, Dec. 2017, 11 pages.
Koos et al. "Crossing the reality gap in evolutionary robotics by promoting transferable controllers," Proceedings of the 12th annual conference on Genetic and evolutionary computation, ACM, Jul. 7, 2010, 9 pages.
Koos et al. "The transferability approach: Crossing the reality gap in evolutionary robotics," IEEE Transaction on Evolutionary Computation, 17(1), Feb. 10, 2012, 26 pages.
Lee et al. "Stochastic adversarial video prediction," arXiv 1804.01523, Apr. 4, 2018, 26 pages.
Lillicrap et al. "Continuous control with deep reinforcement learning" arXiv 1509.02971v3, Jul. 5, 2019, 14 pages.
Liu et al. "Representation balancing mdps for off-policy policy evaluation," NIPS, Dec. 2018, 10 pages.
Machado et al. "Revisiting the arcade learning environment: Evaluation protocols and open problems for general agents," Journal of Artificial Intelligence Research, vol. 61, Mar. 19, 2018, 40 pages.
Mahmood et al. "Weighted importance sampling for off-policy learning with linear function approximation," NIPS, Dec. 2014, 9 pages.
Mannor et al. "Bias and variance approximation in value function estimates," Management Science, 53(2), Feb. 2007, 18 pages.
Mnih et al. "Human-level control through deep reinforcement learning," Nature, 518(7540), Feb. 2015, 13 pages.
Murphy. "A generalization error for Q-Learning," J. Mach. Learn. Res., vol. 6, Jul. 2005, 25 pages.
Nichol et al. "Gotta learn fast: A new benchmark for generalization in rl," arXiv 1804.03720v2, Apr. 23, 2018, 21 pages.
Precup et al. "Eligibility traces for off-policy policy evaluation," Proceedings of the Seventeenth International Conference on Machine Learning, Jan. 1, 2000, 9 pages.
Quillen et al. "Deep reinforcement learning for vision-based robotic grasping: A simulated comparative evaluation of Off-Policy methods," arXiv1802.10264v2, May 28, 2018, 8 pages.
Raghu et al. "Can deep reinforcement learning solve erdos-selfridge-spencer games?" International Conference on Machine Learning, Jul. 3, 2018, 9 pages.
Reidmiller et al. "Learning by playing-solving sparse regard tasks from scratch," arXiv1802.10567, Feb. 28, 2018, 18 pages.
Ross et al. "Efficient reductions for imitation learning," AISTATS, Mar. 31, 2010, 8 pages.
Spearman. "The proof and measurement of association between two things," The American Journal of Psychology, 1987, reprint of original 1904 article, 32 pages.
Theocharous et al. "Personalized ad recommendation systems for life-time value optimization with guarantees," IJCAI, Jun. 24, 2015, 7 pages.
Thomas et al. "Data-Efficient Off-Policy policy evaluation for reinforcement learning," ICML, Jun. 2016, 10 pages.
Thomas et al. "High-Confidence Off-Policy evaluation," AAAI, Feb. 21, 2015, 7 pages.
Todorov et al. "Mujoco: A physics engine for model-based control," IEEE/RSJ International Conference Intelligent Robots and Systems, Oct. 7, 2012.
Van Hasselt et al. "Deep reinforcement learning with double q-learning," Thirtieth AAAI Conference on Artificial Intelligence, Mar. 2, 2016, 7 pages.
Zhang et al. "A dissection of overfitting and generalization in continuous reinforcement learning" arXiv 1806.07937v2, Jun. 25, 2018, 20 pages.
Zhang et al. "A study on overfitting in deep reinforcement learning," arXiv 1804.06893v2, Apr. 20, 2018, 25 pages.

* cited by examiner

OFF-POLICY CONTROL POLICY EVALUATION

CROSS-REFERENCE TO RELATED APPLICATION

This application claims the benefit under 35 U.S.C. § 119(a) of the filing date of Greek Patent Application No. 20190100130, filed in the Greek Patent Office on Mar. 22, 2019. The disclosure of the foregoing application is herein incorporated by reference in its entirety.

BACKGROUND

This specification relates to evaluating neural network-based control policies for agents.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of weights.

SUMMARY

This specification describes a system implemented as computer programs on one or more computers in one or more locations that evaluates a control policy to determine whether to deploy the control policy to control a target agent interacting with a target environment. The control policy that is being evaluated has been learned, i.e., trained, on interactions of a source agent interacting with a source environment. Advantageously, the system evaluates whether the control policy will perform well in controlling the target agent in the target environment without needing to control the target agent using the control policy. Such an evaluation is referred to as an "off-policy" evaluation.

Particular embodiments of the subject matter described in this specification can be implemented so as to realize one or more of the following advantages.

The described systems predict the performance of a given control policy for controlling a target agent in a target environment using only offline data (collected by a different policy). With this effective off-policy evaluation metric, the need for evaluation of a control policy by actually controlling the target agent in the target environment with the policy that is being evaluated is eliminated. For example, practitioners can perform model selection and optimize architecture, hyper-parameters and other techniques entirely in simulation and without requiring real-world interaction. As another example, in many cases real-world evaluations may be unsafe, especially in applications such as robotics where a poor policy may harm the robot or its environment, and can be avoided by using the described techniques. In particular, the described off-policy metric can reject such potentially poor policies without the need to evaluate them in the real-world. Finally, in settings where the aim is to transfer a policy from a training environment into a different deployment environment, such as when training a robot in a laboratory setting or even in simulation, an effective off-policy evaluation metric as described in this specification makes it feasible to perform model selection and algorithm design entirely in the training environment, without costly test deployments.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a control policy can be evaluated to determine whether to deploy the control policy to control a target agent interacting with a target environment.

The control policy that is being evaluated has been learned, i.e., trained, on interactions of a source agent interacting with a source environment.

Advantageously, the evaluation of whether the control policy will perform well in controlling the target agent in the target environment is performed without needing to control the target agent using the control policy. Such an evaluation is referred to as an "off-policy" evaluation.

In some examples, the target environment is a real-world environment and the target agent is a mechanical agent, e.g., a robot or an autonomous vehicle.

In some of these examples, the source environment is a simulation of the real-world environment and the source agent is a simulation of the target agent. Thus, a control policy learned in simulation can be evaluated without needing to evaluate the policy in the real-world environment.

In some of these examples, the source environment is the same real-world environment and the source agent is the same mechanical agent, but the training data set used to learn the policy has different characteristics from the validation data set used to evaluate the policy. Thus, a control policy learned on only a small amount of data collected during control of the agent using a different policy or learned on data that is "mismatched," i.e., does not accurately capture the distribution of possible states of the target environment, does not need to be used to control the agent in order to evaluate the control policy. As a particular example, the control policy being evaluated can be learned in a laboratory or other controlled environment and the performance of the control policy and the performance of this learned control policy in a less controlled environment, e.g., in public areas, businesses, or residential environment, can be evaluated without needing to deploy the policy in the less controlled environment.

In some examples, the target environment is an industrial facility and the target agent is a control system for the industrial facility. In some of these examples the source environment is a simulation of the industrial facility and the source agent is a simulation of the control system. In others of these examples the target environment and the source environment are the same industrial facility but the training data set was collected using a different control policy than the validation data set.

Figure 1:
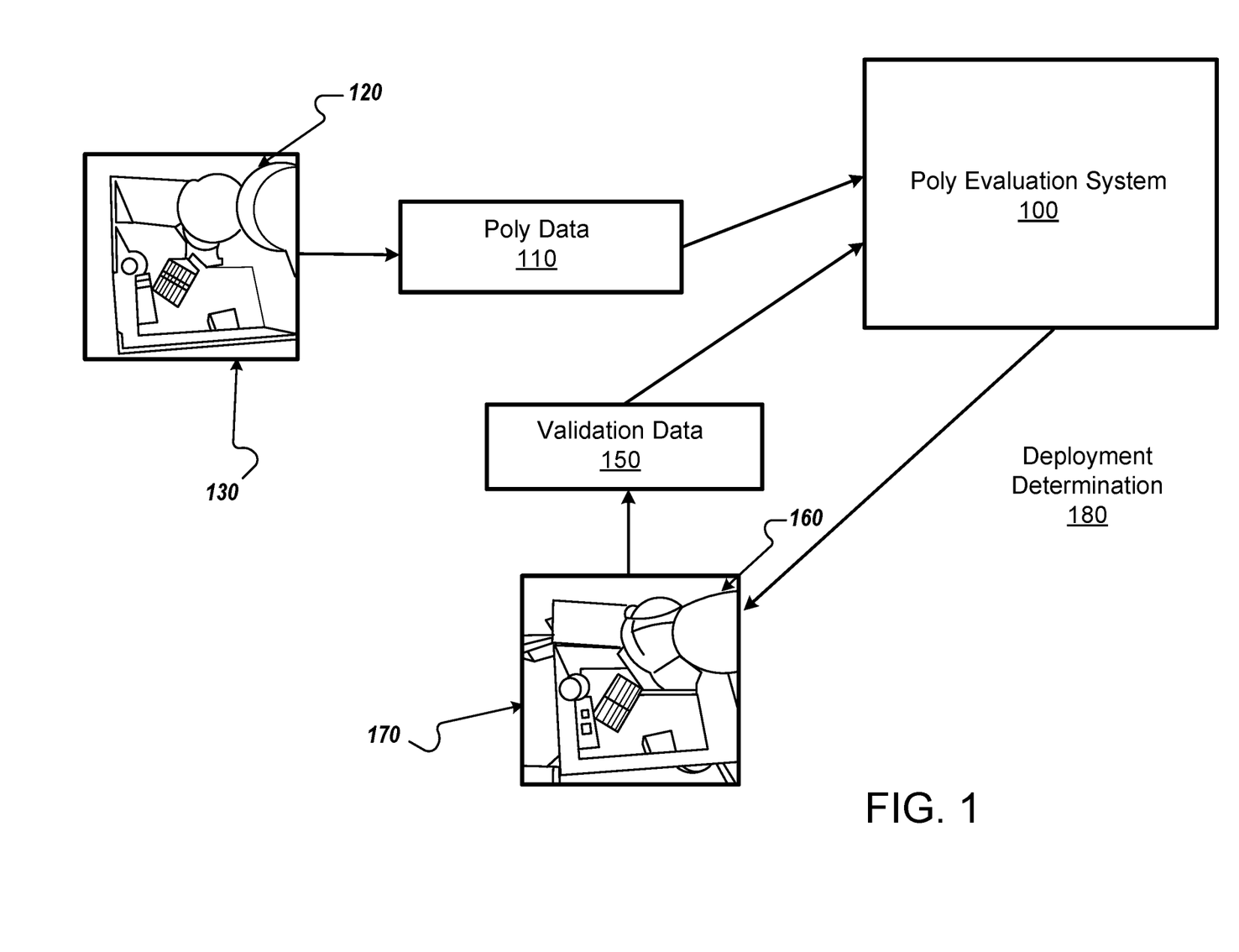
FIG. 1 shows an example policy evaluation system.

FIG. 1 shows an example policy evaluation system 100. The system 100 is an example of a system implemented as computer programs on one or more computers in one or more locations, in which the systems, components, and techniques described below can be implemented.

In particular, the system 100 obtains policy data 110 specifying a control policy for controlling a source agent 120 interacting with a source environment 130 to perform a particular task.

The policy data 110 includes data specifying a trained Q neural network that has been trained to receive a network input including an observation characterizing a state of the source environment and an action from a set of possible actions that can be performed by the agent 120 and to generate as output a Q value that represents a return that would be received by the source agent 120 if the action was performed by the source agent 120 in response to the observation.

When the agents are mechanical agents or simulations of mechanical agents, the observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g., steering, and movement e.g., braking and/or acceleration of the vehicle.

In the case of an electronic agent the observations may include data from one or more sensors monitoring part of a plant or service facility such as current, voltage, power, temperature and other sensors and/or electronic signals representing the functioning of electronic and/or mechanical items of equipment. For example the real-world environment may be a manufacturing plant or service facility, the observations may relate to operation of the plant or facility, for example to resource usage such as power consumption, and the agent may control actions or operations in the plant/facility, for example to reduce resource usage. In some other implementations the real-world environment may be a renewal energy plant, the observations may relate to operation of the plant, for example to maximize present or future planned electrical power generation, and the agent may control actions or operations in the plant to achieve this.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g., to adjust or turn on/off components of the plant/facility.

More specifically, during training, the agent 120 receives a respective reward in response to each action 120 performed by the agent 120, where the reward is a scalar numerical value and characterizes, e.g., a progress of the agent towards completing the task. As a particular example, the reward can be a sparse binary reward that is zero unless the task is successfully completed and one if the task is successfully completed as a result of the action performed.

A return refers to a cumulative measure of rewards received by the agent 120, for example, a time-discounted sum of rewards. Thus, the Q value generated as output of the Q neural network is an estimate of the return that would be received by the agent 120 after performing the action in response to observation.

As an example, the control policy that is specified by the policy data 110 can be to select the action that has the highest Q value as the action to be performed by the agent in response to each received observation.

The system 100 also obtains a validation data set 150 generated from interactions of a target agent 160 in a target environment 170. Generally, the validation data set 150 is generated while the target agent 160 is being controlled by a different control policy than the policy that is being evaluated by the system 100. Examples of other policies include control by an expert user, simpler policies, e.g., hard-coded policies, that may be less effective but are known to result in safe operation, or random policies that randomly select actions from a known safe range in response to any given observation.

In the example of FIG. 1, the target environment 170 is a real-world environment and the source environment 130 is a simulation of the real-world environment. Similarly, the agent 160 is a real-world robot and the agent 120 is a simulation of the real-world robot.

The validation data set 150 generally includes a plurality of trajectories generated as a result of the target agent 160 interacting with the target environment 170. Each trajectory includes observations received during an interaction with the environment 170 and actions performed by the target agent 160 in response to those observations. Each trajectory also includes data indicating whether the task was successfully performed by the agent by performing the actions in the trajectory. For example, the trajectory can also include the rewards received in response to performing the actions in the trajectory or other data indicating whether the task was successfully performed by performing the actions.

To evaluate the control policy, the system 100 processes each observation—action pair, i.e., each pair that includes an observation and the action performed in response to the observation, in each trajectory using the trained Q neural network to generate a respective Q value for each of the observation—action pairs.

The system 100 then determines, from the Q values, a performance estimate that represents an estimate of a performance of the control policy in controlling the target agent to perform the particular task in the target environment and makes, based on the performance metric a deployment determination 180. In other words, the system 100 determines, based on the performance estimate, whether to deploy the control policy for controlling the target agent 160 to perform the particular task in the target environment 170.

Example techniques for determining the performance metric from the Q values are described in more detail below with reference to FIGS. 3 and 4.

The system 100 can determine whether to deploy the control policy based on the performance estimate in any of a variety of ways.

For example, when the control policy is the only candidate policy for being deployed for controlling the target agent 160 to perform the particular task in the target environment 170, the system 100 can determine whether the performance estimate exceeds a threshold value and only determine to deploy the control policy when the threshold value is exceeded.

In some other examples, the system 100 may be selecting between multiple control policies, i.e., the current control policy and one or more other control policies.

For example, each of the multiple control policies can be specified by different values of the parameters of the same Q network, i.e., each control policy is specified by a neural network with the same architecture but different parameter values. As a particular example, the different parameter values may be the values of the parameters of the Q network at different checkpoints during the training of the Q network. As another particular example, the different parameter values may be the values of the parameters of the Q network after training the Q network on different training data, different values of hyperparameters of the training process, or both.

As another example, each of the multiple control policies can be specified by a Q network having a different architecture. In particular, the system or another system may have trained a population of different Q network architectures, e.g., as part of a neural architecture search to identify the architecture that would perform the best in controlling the source agent.

When there are one or more other control policies that are being considered in addition to the current control policy, the system 100 determines a respective performance estimate for each of the other control policies, i.e., using the same technique as used for the current control policy, and determines whether the performance estimate for the current control policy is higher than the performance estimates for the other control policies. The system then only deploys the current control policy if the performance estimate for the current control policy is the higher than for all of the other control policies.

In response to determining to deploy the control policy for controlling the target agent 160 to perform the particular task in the target environment 170, the system can either provide data specifying the control policy for use in controlling the target agent 160, i.e., provide data to the control system for the target agent, or cause the target agent 160 to operate under the control of the control policy if the system can directly control the target agent 160.

Figure 2:
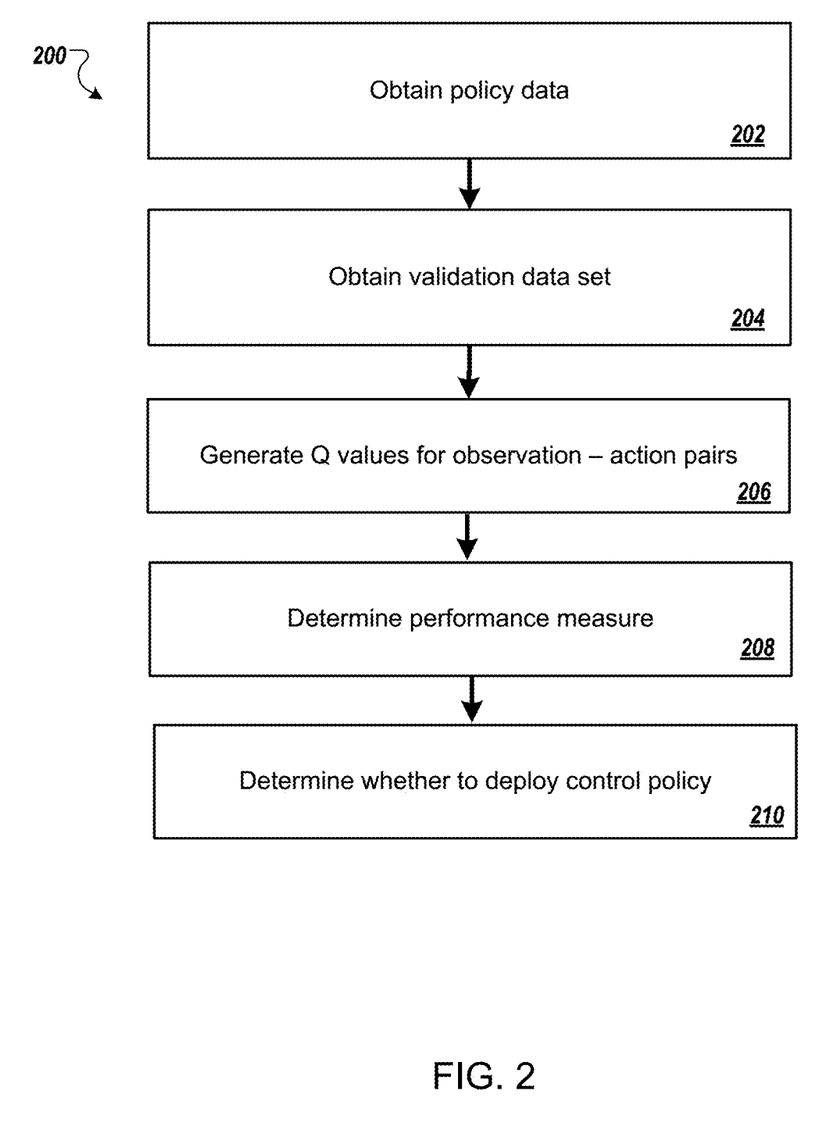
FIG. 2 is a flow diagram of an example process for evaluating a control policy.

FIG. 2 is a flow diagram of an example process 200 for evaluating a control policy. For convenience, the process 200 will be described as being performed by a system of one or more computers located in one or more locations. For example, a policy evaluation system, e.g., the policy evaluation system 100 of FIG. 1, appropriately programmed, can perform the process 200.

The system obtains policy data (step 202) specifying a control policy for controlling a source agent interacting with a source environment to perform a particular task. As described above, the policy data includes data specifying a trained Q neural network.

The system obtains a validation data set generated from interactions of a target agent in a target environment (step 204).

The system processes each observation—action pair in each of the trajectories using the trained Q neural network to generate a respective Q value for each of the observation—action pairs (step 206).

The system determines, from the Q values, a performance estimate that represents an estimate of a performance of the control policy in controlling the target agent to perform the particular task in the target environment (step 208). Determining the performance estimate is described below with reference to FIGS. 3 and 4.

The system determines, based on the performance estimate, whether to deploy the control policy for controlling the target agent to perform the particular task in the target environment (step 210).

Figure 3:
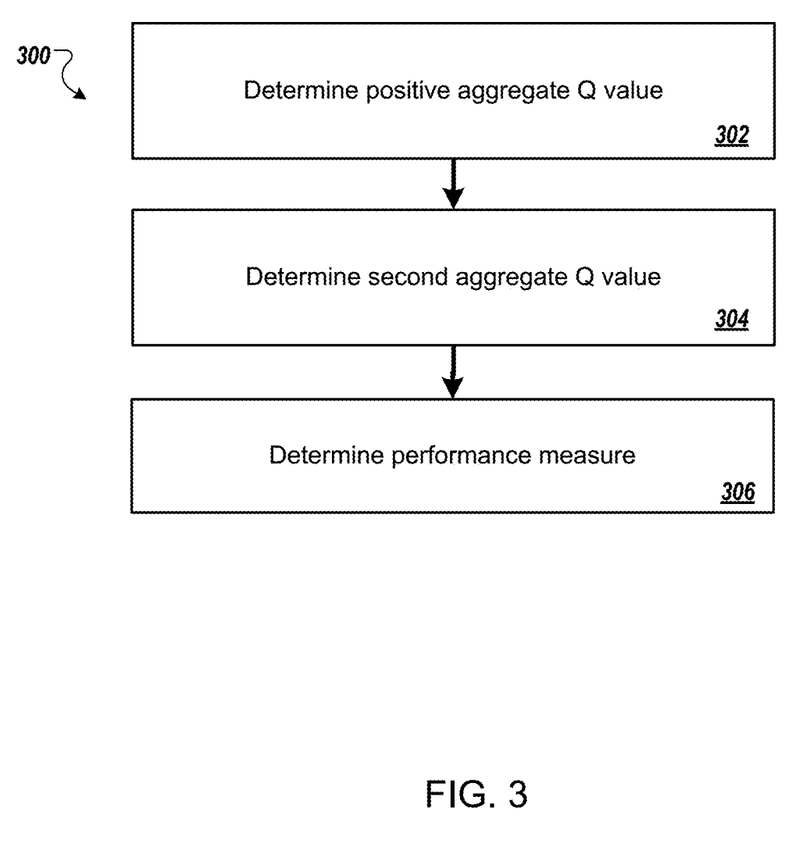
FIG. 3 is a flow diagram of an example process for determining a performance measure for a control policy.

FIG. 3 is a flow diagram of an example process 300 for generating a performance estimate for a control policy. For convenience, the process 300 will be described as being performed by a system of one or more computers located in one or more locations. For example, a policy evaluation system, e.g., the policy evaluation system 100 of FIG. 1, appropriately programmed, can perform the process 300.

The system determines a positive aggregate Q value (step 302). The positive aggregate Q value is a value that is computed from the Q values for the observation—action pairs in the positive-reward trajectories in the validation data, where each positive-reward trajectory is a trajectory of actions in which the particular task was successfully completed by the target agent. For example, the positive aggregate Q value can be the average of the Q values for the observation—action pairs in the positive-reward trajectories.

The system determines a second aggregate Q value (step 304).

The second aggregate Q value is a value that is computed from the Q values for the observation—action pairs in a different subset of the trajectories in the validation than the positive aggregate Q value. For example, the second aggregate Q value can be the average of the Q values for the observation—action pairs in the different subset of trajectories.

As one example, the second aggregate Q value can be an overall aggregate Q value that is computed from the Q values for the observation—action pairs in all of the trajectories in the validation data, i.e., including both the positive-reward trajectories and trajectories in which the particular task was not successfully completed by the target agent. For example, the overall aggregate Q value can be the average of the Q values for the observation—action pairs in all of the trajectories in the validation data.

As another example, the second aggregate Q value can be a negative aggregate Q value that is computed from the Q values for the observation—action pairs in the negative-reward trajectories in the validation data, where each negative-reward trajectory is a trajectory of actions in which the particular task was not successfully completed by the target agent. For example, the negative aggregate Q value can be the average of the Q values for the observation—action pairs in the negative-reward trajectories.

The system determines the performance estimate from the positive aggregate Q value and the second aggregate Q value (step 306). For example, the performance estimate can be based on, e.g., equal to or directly proportional to, the difference between the positive aggregate Q value and the second aggregate Q value.

Figure 4:
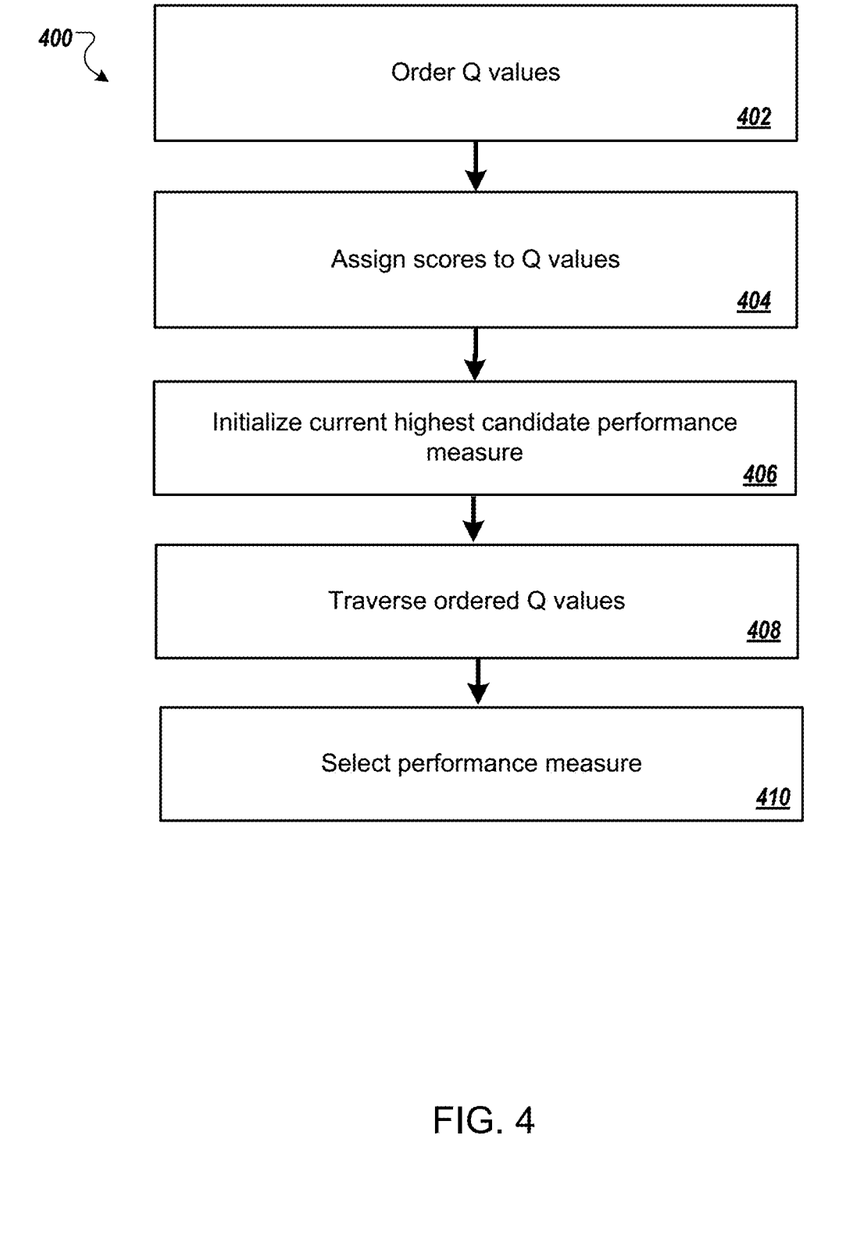
FIG. 4 is a flow diagram of another example process for determining a performance measure for a control policy.

FIG. 4 is a flow diagram of another example process 400 for generating a performance estimate for a control policy. For convenience, the process 400 will be described as being performed by a system of one or more computers located in one or more locations. For example, a policy evaluation system, e.g., the policy evaluation system 100 of FIG. 1, appropriately programmed, can perform the process 400.

Generally, the process 400 describes a technique for identifying the highest candidate performance measure for any possible value of a threshold b. The system then selects this highest candidate performance measure as the final performance measure for the control policy.

More specifically, the candidate performance measure for a given value of the threshold b is based on (i) the probability that the Q value for an observation-action pair exceeds b if the observation-action pair is sampled from the positive-reward trajectories in the validation data and (ii) the probability that the Q value for an observation-action pair exceeds b if the observation-action pair is sampled from all of the trajectories in the validation data, i.e., both the positive-reward trajectories and the other trajectories in the validation data. For example, the candidate performance measure for a given value of b can be the difference between (i) and (ii) for the value of b. Thus, in this example, the process 500 describes a technique that identifies the maximum difference between (i) and (ii) for any possible value of b and then returns this maximum difference as the performance measure for the control policy.

The system orders the Q values for the observation-action pairs from all of the trajectories from highest Q value to lowest Q value (step 402).

The system assigns a respective score to each Q value (step 404). In particular, for a given Q value, the score is based on (i) the number of observation—action pairs from positive trajectories that have the Q value and (ii) the number of observation—action pairs from other, non-positive trajectories that have the Q value. In particular, the score for the given Q value can satisfy: p/N-q/M, where p is the number of observation—action pairs from positive trajectories that have the Q value, N is the total number of observation—action pairs in the positive trajectories, q is the number of observation—action pairs from other trajectories that have the Q value, and N is the total number of observation—action pairs in all of the trajectories.

The system initializes the current highest candidate performance measure to a predetermined value, e.g., zero (step 406). The system also initializes a running total value to the same value as the current highest candidate performance measure.

The system traverses the ordered Q values starting from the lowest to the highest to identify the highest candidate performance measure for any possible value of b (step 408).

In particular, for each Q value in the ordering starting from the lowest, the system updates the running total value by adding the score for the Q value to the running total value. The system then determines whether the updated running total value is higher than the current highest candidate performance measure and, if so, sets the current highest candidate performance measure equal to the updated running total value.

The system then identifies the current highest candidate performance measure after traversing all of the ordered Q values as being the highest candidate performance measure for any possible value of b.

The system selects the identified highest candidate performance measure as the performance measure for the control policy (step 410).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining policy data specifying a control policy for controlling a source agent interacting with a source environment to perform a particular task, wherein the policy data comprises data specifying a trained Q neural network, and wherein the trained Q neural network has been trained to receive a network input comprising an observation characterizing a state of the source environment and an action from a set of possible actions that can be performed by the agent and to generate a Q value that represents a return that would be received by the source agent if the action was performed by the source agent in response to the observation;
    obtaining a validation data set generated from interactions of a target agent in a target environment, the validation data set comprising a plurality of trajectories, wherein:
        each trajectory comprises a respective plurality of observation—action pairs,
        each observation—action pair includes an observation and an action performed by the target agent in response to the observation,
        the plurality of trajectories comprises a plurality of positive-reward trajectories and a plurality of negative-reward trajectories,
        each positive-reward trajectory is a trajectory of actions in which the particular task was successfully completed by the target agent, and
        each negative-reward trajectory is a trajectory of actions in which the particular task was not successfully completed by the target agent;
    processing each observation—action pair in each of the trajectories using the trained Q neural network to generate a respective Q value for each of the observation—action pairs;
    determining a positive aggregate Q value from the Q values for the observation—action pairs in the positive-reward trajectories;
    determining a second aggregate Q value from the Q values for the observation—action pairs in a second subset of the plurality of trajectories that includes at least the negative-reward trajectories;
    determining, from the positive aggregate Q value and the second aggregate Q value, a performance estimate that represents an estimate of a performance of the control policy in controlling the target agent to perform the particular task in the target environment; and
    determining, based on the performance estimate, whether to deploy the control policy for controlling the target agent to perform the particular task in the target environment.

2. The method of claim 1, wherein the second subset of the plurality of trajectories includes only the negative-reward trajectories.

3. The method of claim 1, wherein the second subset of the plurality of trajectories includes the positive-reward trajectories and the negative-reward trajectories.

4. The method of claim 1, wherein the target environment is a real-world environment, wherein the target agent is a mechanical agent, wherein the source environment is a simulation of the real-world environment and wherein the source agent is a simulation of the target agent.

5. The method of claim 1, wherein the target environment and the source environment are the same real-world environment, wherein the target agent and the source agent are the same mechanical agent, and wherein the training data set has different characteristics from the validation data set.

6. The method of claim 5, wherein the validation data set was collected by controlling the agent in accordance with a different control policy.

7. The method of claim 1, wherein the target environment is an industrial facility, wherein the target agent is a control system for the industrial facility, wherein the source environment is a simulation of the industrial facility and wherein the source agent is a simulation of the control system.

8. The method of claim 1, wherein the target environment and the source environment are the same industrial facility, wherein the target agent and the source agent are the same control system for the industrial facility, and wherein the training data set was collected using a different control policy than the validation data set.

9. The method of claim 1, wherein determining a positive aggregate Q value from the Q values for the observation—action pairs in the positive-reward trajectories comprises:
    determining an average of the Q values for the observation—action pairs in the positive-reward trajectories.

10. The method of claim 1, wherein determining a second aggregate Q value comprises:
    determining an average of the Q values for the observation—action pairs in the trajectories in the second subset.

11. The method of claim 1, wherein the performance estimate is based on a difference between the positive aggregate Q value and the second aggregate Q value.

12. The method of claim 1, further comprising:
in response to determining, based on the performance estimate, to deploy the control policy for controlling the target agent to perform the particular task in the target environment:
providing data specifying the control policy for use in controlling the target agent.

13. The method of claim 1, further comprising:
in response to determining, based on the performance estimate, to deploy the control policy for controlling the target agent to perform the particular task in the target environment:
causing the target agent to operate under the control of the control policy.

14. The method of claim 1, wherein determining, based on the performance estimate, whether to deploy the control policy for controlling the target agent to perform the particular task in the target environment comprises:
determining whether the performance estimate exceeds a threshold value.

15. The method of claim 1, wherein determining, based on the performance estimate, whether to deploy the control policy for controlling the target agent to perform the particular task in the target environment comprises:
obtaining data specifying one or more other control policies;
determining a respective performance estimate for each of the other control policies; and
determining whether the performance estimate for the control policy is higher than the performance estimates for the other control policies.

16. A system comprising one or more computers and one more storage devices storing instructions that when executed by the one or more computers cause the one or more computers to perform operations comprising:
obtaining policy data specifying a control policy for controlling a source agent interacting with a source environment to perform a particular task, wherein the policy data comprises data specifying a trained Q neural network, and wherein the trained Q neural network has been trained to receive a network input comprising an observation characterizing a state of the source environment and an action from a set of possible actions that can be performed by the agent and to generate a Q value that represents a return that would be received by the source agent if the action was performed by the source agent in response to the observation;
obtaining a validation data set generated from interactions of a target agent in a target environment, the validation data set comprising a plurality of trajectories, wherein:
each trajectory comprises a respective plurality of observation—action pairs,
each observation—action pair includes an observation and an action performed by the target agent in response to the observation,
the plurality of trajectories comprises a plurality of positive-reward trajectories and a plurality of negative-reward trajectories,
each positive-reward trajectory is a trajectory of actions in which the particular task was successfully completed by the target agent, and
each negative-reward trajectory is a trajectory of actions in which the particular task was not successfully completed by the target agent;
processing each observation—action pair in each of the trajectories using the trained Q neural network to generate a respective Q value for each of the observation—action pairs;
determining a positive aggregate Q value from the Q values for the observation—action pairs in the positive-reward trajectories;
determining a second aggregate Q value from the Q values for the observation—action pairs in a second subset of the plurality of trajectories that includes at least the negative-reward trajectories;
determining, from the positive aggregate Q value and the second aggregate Q value, a performance estimate that represents an estimate of a performance of the control policy in controlling the target agent to perform the particular task in the target environment; and
determining, based on the performance estimate, whether to deploy the control policy for controlling the target agent to perform the particular task in the target environment.

17. The system of claim 16, wherein the second subset of the plurality of trajectories includes only the negative-reward trajectories.

18. The system of claim 16, wherein the second subset of the plurality of trajectories includes the positive-reward trajectories and the negative-reward trajectories.

19. The system of claim 16, wherein the target environment is a real-world environment, wherein the target agent is a mechanical agent, wherein the source environment is a simulation of the real-world environment and wherein the source agent is a simulation of the target agent.

20. One more non-transitory computer-readable media storing instructions that when executed by one or more computers cause the one or more computers to perform operations comprising:
obtaining policy data specifying a control policy for controlling a source agent interacting with a source environment to perform a particular task, wherein the policy data comprises data specifying a trained Q neural network, and wherein the trained Q neural network has been trained to receive a network input comprising an observation characterizing a state of the source environment and an action from a set of possible actions that can be performed by the agent and to generate a Q value that represents a return that would be received by the source agent if the action was performed by the source agent in response to the observation;
obtaining a validation data set generated from interactions of a target agent in a target environment, the validation data set comprising a plurality of trajectories, wherein:
each trajectory comprises a respective plurality of observation—action pairs,
each observation—action pair includes an observation and an action performed by the target agent in response to the observation,
the plurality of trajectories comprises a plurality of positive-reward trajectories and a plurality of negative-reward trajectories,
each positive-reward trajectory is a trajectory of actions in which the particular task was successfully completed by the target agent, and
each negative-reward trajectory is a trajectory of actions in which the particular task was not successfully completed by the target agent;

processing each observation—action pair in each of the trajectories using the trained Q neural network to generate a respective Q value for each of the observation—action pairs;

determining a positive aggregate Q value from the Q values for the observation—action pairs in the positive-reward trajectories;

determining a second aggregate Q value from the Q values for the observation—action pairs in a second subset of the plurality of trajectories that includes at least the negative-reward trajectories;

determining, from the positive aggregate Q value and the second aggregate Q value, a performance estimate that represents an estimate of a performance of the control policy in controlling the target agent to perform the particular task in the target environment; and determining, based on the performance estimate, whether to deploy the control policy for controlling the target agent to perform the particular task in the target environment.

* * * * *